(12) United States Patent
Revis

(10) Patent No.: US 8,255,788 B2
(45) Date of Patent: Aug. 28, 2012

(54) METHOD AND APPARATUS FOR FACILITATING SUBSTITUTION OF DIGITAL IMAGES WITH LINE DRAWINGS

(75) Inventor: Paul A. Revis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 1268 days.

(21) Appl. No.: 11/106,891

(22) Filed: Apr. 15, 2005

(65) Prior Publication Data

US 2005/0183039 A1  Aug. 18, 2005

Related U.S. Application Data

(63) Continuation of application No. 09/550,726, filed on Apr. 17, 2000, now Pat. No. 6,912,689.

(51) Int. Cl.
*G06F 17/00* (2006.01)

(52) U.S. Cl. ........ 715/208; 715/788; 715/800; 715/205; 715/253; 382/307

(58) Field of Classification Search .................. 715/838, 715/800, 208, 788, 205, 253; 382/307
See application file for complete search history.

(56) References Cited

U.S. PATENT DOCUMENTS

| | | | |
|---|---|---|---|
| 5,748,931 A | 5/1998 | Jones et al. | |
| 5,809,179 A | 9/1998 | Marimont et al. | |
| 6,169,549 B1 * | 1/2001 | Burr | 345/419 |
| 6,275,829 B1 | 8/2001 | Angiulo et al. | |
| 6,304,277 B1 * | 10/2001 | Hoekstra et al. | 345/600 |
| 6,400,375 B1 * | 6/2002 | Okudaira | 345/668 |
| 6,457,026 B1 | 9/2002 | Graham et al. | |

(Continued)

OTHER PUBLICATIONS

Barry Haynes and Wendy Crumpler, Photoshop 5 Artistry, New Riders Publishing 1998, pp. 19-22, 306-310.*

*Primary Examiner* — Stephen Hong
*Assistant Examiner* — Matthew Ludwig
(74) *Attorney, Agent, or Firm* — Dorsey & Whitney LLP

(57) ABSTRACT

One embodiment of the present invention provides a system that facilitates substitution of a full bitmap version of a graphical image with a line drawing version of the graphical image in a graphical presentation. The system operates by displaying a page in the graphical presentation, which includes the line drawing version of the graphical image. Next, the system allows a user to input a command to display the full bitmap version of the graphical image. If the user inputs the command, the system retrieves the full bitmap version of the graphical image, and displays the full bitmap version of the graphical image. Note that displaying the line drawing version of the graphical image requires less data to be retrieved than displaying the full bitmap version of graphical image. Consequently, loading the line drawing version of the graphical image takes less time than loading the full bitmap version. Another embodiment of the present invention provides a system that facilitates substitution of a full bitmap version of a graphical image with a line drawing version of the graphical image in a graphical presentation. The system receives the full bitmap version of the graphical image, and then produces the line drawing version of the graphical image from the full bitmap version of the graphical image. Next, the system inserts the line drawing version of the graphical image into a page in the graphical presentation, and then links the full bitmap version of the graphical image into the graphical presentation so that selecting the line drawing version of the graphical image causes the full bitmap version of the graphical image to be displayed.

21 Claims, 3 Drawing Sheets

U.S. PATENT DOCUMENTS

| | | |
|---|---|---|
| 6,583,799 B1 | 6/2003 | Manolis et al. |
| 6,715,127 B1 * | 3/2004 | Eschbach et al. ............. 715/202 |
| 6,920,610 B1 * | 7/2005 | Lawton et al. ................ 715/209 |
| 6,938,215 B2 * | 8/2005 | Kobayashi et al. ........... 715/810 |
| 7,148,907 B2 * | 12/2006 | Smith et al. ................... 345/629 |
| 2009/0132942 A1 * | 5/2009 | Santoro et al. ................ 715/765 |

* cited by examiner

METHOD AND APPARATUS FOR FACILITATING SUBSTITUTION OF DIGITAL IMAGES WITH LINE DRAWINGS

RELATED APPLICATION

This application is a continuation of, and hereby claims priority under 35 U.S.C. §120 to, a U.S. patent application entitled, "Method and Apparatus for Facilitating Substitution of Digital Images with Line Drawings," by inventor Paul A. Revis, Ser. No. 09/550,726, filed 17 Apr. 2000 now U.S. Pat. No. 6,912,689.

BACKGROUND

1. Field of the Invention

The present invention relates to graphical interfaces for computer systems. More specifically, the present invention relates to a method and an apparatus for facilitating substitution of a graphical image with a line drawing version of the graphical image in a graphical display in order to reduce the time required to retrieve and display the graphical image.

2. Related Art

The recent success of the world wide web can largely be attributed to the ease with which visitors to web sites can navigate through web pages containing textual information interspersed with graphical images. Unfortunately, these graphical images are typically stored as large bitmaps that require a great deal of time to transfer across a low-bandwidth modem connection. This creates significant delays in loading web pages, which can greatly annoy visitors to web sites.

In order to remedy this problem, web site designers can reduce the size and number of graphical images that are displayed on a web site. Alternatively, they can do away with graphical images altogether. However, either of these options greatly reduces the visual impact of a web site, and can thereby detract from the experience of navigating through the web site.

Another way to reduce delays in loading web pages is to use a "thumbnail" of a graphical image in place of the graphical image. A thumbnail is a miniature version of the graphical image that can be "clicked on" with a pointing device, such as a mouse, in order to display the larger full graphical image. However, thumbnails are small and difficult to view. They are also smaller than the full graphical image. Consequently, when a thumbnail is expanded, it often displaces textual information or other images in a web page.

Another way to reduce delays in loading web pages is to use a lower resolution version of a graphical image, which requires less time to retrieve across a network. However, a lower resolution version of the graphical image is not as pleasant to view as the original higher resolution version of the graphical image. Furthermore, many details of the graphical image are lost in converting to the lower resolution version.

What is needed is a method and an apparatus that reduces the amount of data that must be retrieved in order to display a graphical image in a web page without the disadvantages of using a thumbnail or a lower resolution version of the graphical image.

SUMMARY

One embodiment of the present invention provides a system that facilitates substitution of a full bitmap version of a graphical image with a line drawing version of the graphical image in a graphical presentation. The system operates by displaying a page in the graphical presentation, which includes the line drawing version of the graphical image. Next, the system allows a user to input a command to display the full bitmap version of the graphical image. If the user inputs the command, the system retrieves the full bitmap version of the graphical image, and displays the full bitmap version of the graphical image. Note that displaying the line drawing version of the graphical image requires less data to be retrieved than displaying the full bitmap version of graphical image. Consequently, loading the line drawing version of the graphical image takes less time than loading the full bitmap version.

In one embodiment of the present invention, the graphical presentation is part of a web site and the page is a web page within the web site.

In one embodiment of the present invention, the user inputs the command to display the full bitmap version of the graphical image by using a pointing device to move a cursor over the line drawing version of the graphical image, and by depressing a button associated with the pointing device.

In one embodiment of the present invention, the full bitmap version of the graphical image is displayed in another page that contains the full bitmap version of the graphical image alone.

In one embodiment of the present invention, the full bitmap version of the graphical image is displayed in place of the line drawing version of the graphical image within the page in the graphical presentation.

In one embodiment of the present invention, the full bitmap version of the graphical image is retrieved from a remote machine across a network.

One embodiment of the present invention provides a system that facilitates substitution of a full bitmap version of a graphical image with a line drawing version of the graphical image in a graphical presentation. The system receives the full bitmap version of the graphical image, and then produces the line drawing version of the graphical image from the full bitmap version of the graphical image. Next, the system inserts the line drawing version of the graphical image into a page in the graphical presentation, and then links the full bitmap version of the graphical image into the graphical presentation so that selecting the line drawing version of the graphical image causes the full bitmap version of the graphical image to be displayed.

In one embodiment of the present invention, producing the line drawing version of the graphical image from the full bitmap version of the graphical image involves displaying a candidate line drawing version of the graphical image to a producer of the graphical presentation. If the candidate line drawing version of the graphical image is not acceptable, the system allows the producer of the graphical presentation to tune parameters used to generate the line drawing version of the graphical image.

In one embodiment of the present invention, causing the full bitmap version of the graphical image to be displayed includes retrieving the full bitmap version of the graphical image from a remote machine across a network.

One embodiment of the present invention additionally allows a producer of the graphical presentation to specify a location for the line drawing version of the graphical image within the page in the graphical presentation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer Systems

Figure 1:
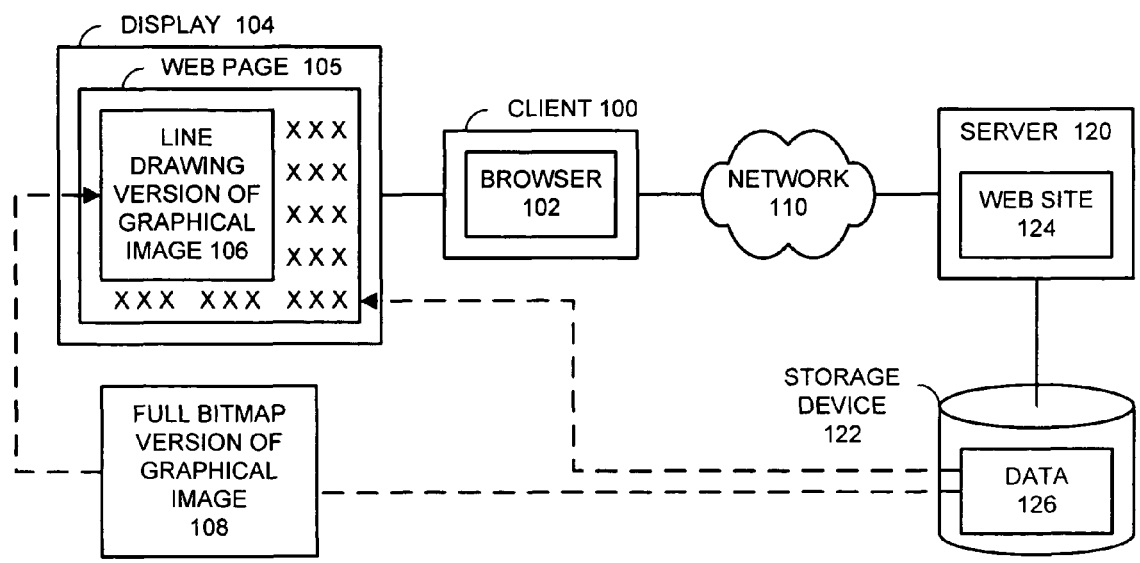
FIG. 1 illustrates computer systems coupled together by a network in accordance with an embodiment of the present invention.

FIG. 1 illustrates computer systems 100 and 120 coupled together by network 110 in accordance with an embodiment of the present invention. Computer systems 100 and 120 may include any type of computer system, including, but not limited to, a computer system based on a microprocessor, a mainframe computer, a digital signal processor, a personal organizer, a device controller, and a computational engine within an appliance.

Network 110 can include any type of wire or wireless communication channel capable of coupling together computing nodes. This includes, but is not limited to, a local area network, a wide area network, or a combination of networks. In one embodiment of the present invention, network 110 includes the Internet.

Computer system 100 is a client computer system, which can generally include any node on a network including computational capability and including a mechanism for communicating across the network. Client 100 contains a browser 102. Browser 102 can generally include any type of web browser capable of viewing a web site, such as the INTERNET EXPLORER™ browser distributed by the Microsoft Corporation of Redmond, Wash. Client 100 also includes a display 104, which can display a web page 105 to a user who is navigating through a web site, such as web site 124.

Web page 105 includes a line drawing version 106 of a graphical image. The line drawing version 106 of the graphical image can be created from a full bitmap version 108 of the graphical image using well-known software packages for manipulating graphical images, such as ADOBE PHOTOSHOP™ distributed by the Adobe Systems Corporation of San Jose, Calif. In general, the line drawing version 106 of the graphical image includes the outlines of shapes that are present in the original full bitmap version 108 of the graphical image. Furthermore, the line drawing version 106 may include black and white or gray scale values in place of the color values in the original full bitmap version 108 of the graphical image.

Computer system 120 is a server computer system, which can generally include any node on a computer network including a mechanism for servicing requests from a client for computational and/or data storage resources. Server 120 includes a web site 124, which comprises a set of inter-linked web pages that a user can navigate through, including web page 105. Web site 124 also includes the full bitmap versions of line drawings within web pages.

The data 126 for web site 124 is stored within storage device 122. Storage device 122 can include any type of non-volatile storage device that can be coupled to a computer system. This includes, but is not limited to, magnetic, optical, and magneto-optical storage devices, as well as storage devices based on flash memory and/or battery-backed up memory.

During operation, the system illustrated in FIG. 1 operates generally as follows. A user of browser 102 navigates through web site 124 on server 120. During this navigation process, web page 105 is retrieved from server 120 by browser 102 and is displayed on display 104. If the user clicks on the line drawing version 106 of the graphical image within web page 105, the system causes the full bitmap version 108 of the graphical image to be retrieved from web site 124 and displayed on display 104. It can either be displayed in place of the line drawing version 106 within web page 105, or alternatively, it can be displayed by itself on a separate web page that contains the full bitmap version 108 of the graphical image.

Process of Selectively Replacing Line Drawing Version of Graphical Image

Figure 2:
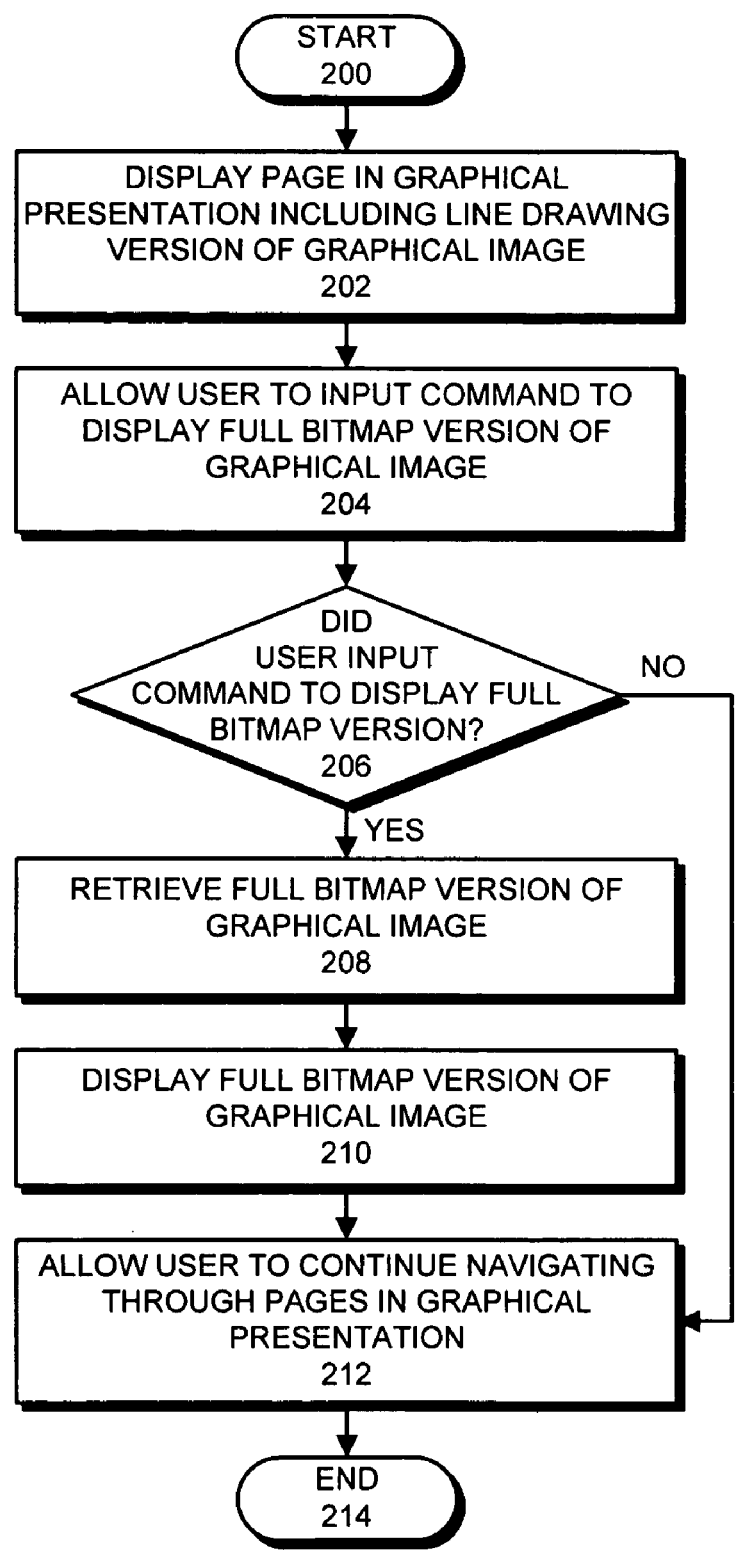
FIG. 2 is a flow chart illustrating the process of selectively replacing a line drawing version of a graphical image with a full bitmap version of the graphical image in accordance with an embodiment of the present invention.

FIG. 2 is a flow chart illustrating the process of selectively replacing a line drawing version of a graphical image with a full bitmap version of the graphical image in accordance with an embodiment of the present invention. The system starts by displaying web page 105 within display 104 (step 202). Web page 105 includes line drawing version 106 of the graphical image. Note that displaying line drawing version 106 takes less time than displaying full bitmap version 108 because line drawing version 106 is more compact and takes less time to retrieve from server 120.

Next, the system allows a user of client 100 to input a command to display the full bitmap version 108 of the graphical image (step 204). In one embodiment of the present invention, the user inputs the command by moving a cursor over line drawing version 106 of the graphical image using a pointing device (such as a mouse), and then clicking a button associated with the pointing device.

Next, the system determines if the user inputted a command to display the full bitmap version 108 of the graphical image (step 206). If not, the system allows the user to continue navigating through the pages in the graphical presentation (step 212). Note that the term "graphical presentation" is more general than the term "web site." It encompasses a "web site" as well as any other mechanism that displays pages, windows or frames containing graphical images.

If the user inputted a command to display the full bitmap version 108 of the graphical image, the system retrieves the full bitmap version 108 (step 208), and then displays it (step 210). As mentioned above, this can involve displaying the full bitmap version 108 of the graphical image in place of line drawing version 106 within web page 105, or alternatively displaying the full bitmap version 108 on its own separate page.

Next, the system allows the user to continue navigating through the pages in the graphical presentation (step 212).

Process of Creating a Web Page

Figure 3:
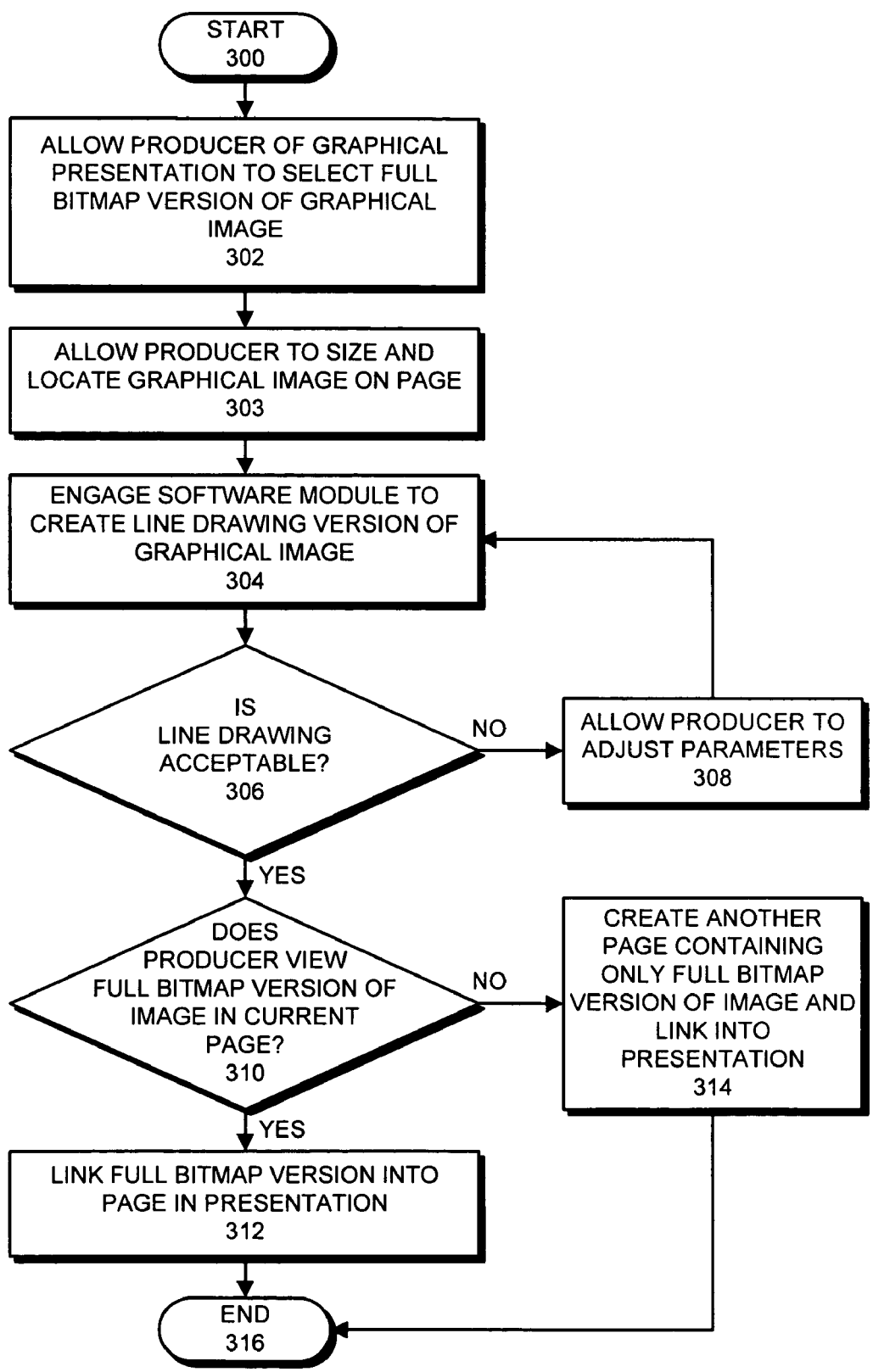
FIG. 3 is a flow chart illustrating the process of creating a web page in which a line drawing version of a graphical image is selectively replaced with a full bitmap version of the graphical image in accordance with an embodiment of the present invention.

FIG. 3 is a flow chart illustrating the process of creating a web page in which a line drawing version of a graphical image is selectively replaced with a full bitmap version of the graphical image in accordance with an embodiment of the present invention. The system starts by allowing a producer of a graphical presentation to select a full bitmap version 108 of a graphical image (step 302). Next, the system allows the producer to adjust the size of the graphical image, and to locate graphical image at a specific location within web page 105 (step 303).

The system then engages a software module to create a line drawing version 106 from the full bitmap version 108 of the graphical image (step 304). The system displays this line drawing version 106 and then asks the producer if the line drawing version 106 is acceptable (step 306). If the producer indicates that it is not acceptable, the system allows the producer to adjust parameters of the software module to create a satisfactory line drawing version 106 of the graphical image (step 308). This adjustment process is repeated until line drawing version 106 is satisfactory.

When the producer indicates that line drawing version 106 is acceptable, the system asks the producer if the producer would like the full bitmap version 108 to appear within web page 105 or within a separate page (step 310). If the producer indicates that he or she would like the full bitmap version 108 to appear in a separate page, the system creates a separate page including the full bitmap version 108 by itself (step 314), and then links this separate page into the graphical presentation so that when the line drawing version 106 is selected, the separate page will be displayed.

Otherwise, if the producer indicates that he or she would like the full bitmap version 108 to appear within web page 105, the system links the full bitmap version 108 into the graphical presentation so that when the line drawing version 106 is selected, the full bitmap version 108 is written in place of the line drawing version 106 of the graphical image within web page 105 (step 312).

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating substitution of a full bitmap version of a graphical image having a plurality of shapes for a line drawing version of the graphical image in a graphical presentation, the method comprising:
   linking the full bitmap version of the graphical image to the line drawing version of the graphical image to display the full bitmap version of the graphical image responsive to the line drawing version of the graphical image being selected;
   displaying a page in the graphical presentation, the page including the line drawing version of the graphical image, wherein the line drawing version includes outlines of the plurality of shapes that are present in the full bitmap version, and
   wherein displaying the line drawing version of the graphical image requires less data to be retrieved than displaying the full bitmap version of graphical image;
   inputting a command by a user to select the displayed line drawing version to display the full bitmap version of the graphical image; and
   in response to the user inputting the command to select the displayed line drawing version to display the full bitmap version of the graphical image,
      retrieving the full bitmap version of the graphical image linked to the line drawing version of the graphical image, and
      displaying the full bitmap version of the graphical image.

2. The method of claim 1, wherein the graphical presentation is part of a web site and the page is a web page within the web site.

3. The method of claim 1, wherein the user inputs the command to display the full bitmap version of the graphical image by using a pointing device to move a cursor over the line drawing version of the graphical image, and by depressing a button associated with the pointing device.

4. The method of claim 1, wherein displaying the full bitmap version of the graphical image involves displaying the full bitmap version of the graphical image in another page that contains the full bitmap version of the graphical image alone.

5. The method of claim 1, wherein displaying the full bitmap version of the graphical image involves displaying the full bitmap version of the graphical image in place of the line drawing version of the graphical image within the page in the graphical presentation.

6. The method of claim 1, further comprising prior to displaying the page in the graphical presentation:
   producing the line drawing version of the graphical image from the full bitmap version of the graphical image;
   inserting the line drawing version of the graphical image into the page in the graphical presentation; and
   linking the full bitmap version of the graphical image into the graphical presentation so that selecting the line drawing version of the graphical image causes the full bitmap version of the graphical image to be displayed.

7. The method of claim 1, wherein retrieving the full bitmap version of the graphical image includes retrieving the full bitmap version of the graphical image from a remote machine across a network.

8. A computer-readable storage medium storing instructions that when executed by a computer cause the computer to perform a method for facilitating substitution of a full bitmap version of a graphical image for a line drawing version of the graphical image in a graphical presentation, the method comprising:
   linking the full bitmap version of the graphical image to the line drawing version of the graphical image to display the full bitmap version of the graphical image responsive to the line drawing version of the graphical image being selected, the line drawing version having been produced from the full bitmap version to include outlines of shapes depicted in the full bitmap version and the line drawing version having been inserted in the graphical representation in place of the full bitmap version;
   displaying a page in the graphical presentation, the page including the line drawing version of the graphical image,
   wherein displaying the line drawing version of the graphical image requires less data to be retrieved than displaying the full bitmap version of graphical image;

inputting a command by a user to select the displayed line drawing version to display the full bitmap version of the graphical image; and in response to the user inputting the command to select the displayed line drawing version to display the full bitmap version of the graphical image, retrieving the full bitmap version of the graphical image linked to the line drawing version of the graphical image, and displaying the full bitmap version of the graphical image.

9. The computer-readable storage medium of claim 8, wherein the graphical presentation is part of a web site and the page is a web page within the web site.

10. The computer-readable storage medium of claim 8, wherein the user inputs the command to display the full bitmap version of the graphical image by using a pointing device to move a cursor over the line drawing version of the graphical image, and by depressing a button associated with the pointing device.

11. The computer-readable storage medium of claim 8, wherein displaying the full bitmap version of the graphical image involves displaying the full bitmap version of the graphical image in another page that contains the full bitmap version of the graphical image alone.

12. The computer-readable storage medium of claim 8, wherein displaying the full bitmap version of the graphical image involves displaying the full bitmap version of the graphical image in place of the line drawing version of the graphical image within the page in the graphical presentation.

13. The computer-readable storage medium of claim 8, wherein prior to displaying the page in the graphical presentation, the method further comprises:

producing the line drawing version of the graphical image from the full bitmap version of the graphical image;

inserting the line drawing version of the graphical image into the page in the graphical presentation; and linking the full bitmap version of the graphical image into the graphical presentation so that selecting the line drawing version of the graphical image causes the full bitmap version of the graphical image to be displayed.

14. The computer-readable storage medium of claim 8, wherein retrieving the full bitmap version of the graphical image includes retrieving the full bitmap version of the graphical image from a remote machine across a network.

15. An apparatus that facilitates substitution of a full bitmap version of a graphical image having a plurality of shapes for a line drawing version of the graphical image in a graphical presentation, the apparatus comprising:

a computer system including a computer processor;

a display mechanism that is configured to display a page in the graphical presentation, the page including the line drawing version of the graphical image, wherein the line drawing version includes outlines of the plurality of shapes depicted in the full bitmap version, and wherein displaying the line drawing version of the graphical image requires less data to be retrieved than displaying the full bitmap version of graphical image; and a command input mechanism that is configured to allow a user to input a command to select the displayed line drawing version to display the full bitmap version of the graphical image, the full bitmap version of the graphical image linked to the line drawing version of the graphical image to provide the full bitmap version of the graphical image responsive to the line drawing version of the graphical image being selected;

in response to the user inputting the command to select the displayed line drawing version to display the full bitmap version of the graphical image, the display mechanism is configured to, retrieve the full bitmap version of the graphical image linked to the line drawing version of the graphical image, and to display the full bitmap version of the graphical image.

16. The apparatus of claim 15, wherein the graphical presentation is part of a web site and the page is a web page within the web site.

17. The apparatus of claim 15, wherein the user inputs the command to display the full bitmap version of the graphical image by using a pointing device to move a cursor over the line drawing version of the graphical image, and by depressing a button associated with the pointing device.

18. The apparatus of claim 15, wherein the display mechanism is configured to display the full bitmap version of the graphical image in another page that contains the full bitmap version of the graphical image alone.

19. The apparatus of claim 15, wherein the display mechanism is configured to display the full bitmap version of the graphical image in place of the line drawing version of the graphical image within the page in the graphical presentation.

20. The apparatus of claim 15, further comprising a presentation preparation mechanism that is configured to:

produce the line drawing version of the graphical image from the full bitmap version of the graphical image;

insert the line drawing version of the graphical image into the page in the graphical presentation; and to link the full bitmap version of the graphical image into the graphical presentation so that selecting the line drawing version of the graphical image causes the full bitmap version of the graphical image to be displayed.

21. The apparatus of claim 15, wherein retrieving the full bitmap version of the graphical image includes retrieving the full bitmap version of the graphical image from a remote machine across a network.

* * * * *